Feb. 28, 1967 H. STAEUDLE ETAL 3,307,114

ELECTRONIC CIRCUIT TO SYNCHRONIZE AUTOMATICALLY
THE FREQUENCY OF A PRF GENERATOR
WITH THE PRF OF A VIDEO SIGNAL
Filed Nov. 18, 1965

HANS STAEUDLE
KLAUS J. HECKER
INVENTORS

BY J. M. St. Amand
ATTORNEYS 3,307,114

ELECTRONIC CIRCUIT TO SYNCHRONIZE AUTOMATICALLY THE FREQUENCY OF A PRF GENERATOR WITH THE PRF OF A VIDEO SIGNAL

Hans Staeudle, Heidenheim-Schnaitheim, and Klaus J. Hecker, Oberursel, Taunus, Germany, assignors to the United States of America as represented by the Secretary of the Navy Filed Nov. 18, 1965, Ser. No. 508,604
2 Claims. (Cl. 331—4)

The invention herein described may be manufactured and used by or for the Government of the United States of America for governmental purposes without the payment of any royalties thereon or therefor.

The present invention relates to synchronizing circuits and more particularly to a system for tuning a pulse repetition frequency (PRF) generator to the PRF of a video signal automatically and to synchronize it with the signal by electronic means.

Similar methods using RF (sine wave) signals are known, but heretofore this has not been accomplished with video signals.

In the instant invention the output voltage of an integrator circuit is used to control the PRF of a voltage-controlled PRF generator. By combining an operational amplifier (integrator) with a Schmitt Trigger, the PRF of the generator is caused to change continuously in a certain frequency range until a video signal is applied to the input. When the PRF of the generator corresponds approximately to the PRF of the input signal, the search process is terminated and the two signals are synchronized by a phase lock loop.

It is an object of the invention to provide a system for automatically tuning a PRF generator to the PRF of a video signal and synchronize same.

Another object of the invention is to provide a circuit for the automatic tuning and synchronizing of the frequency of a PRF generator with a video signal.

A further object of the invention is to provide a PRF video signal search-and-synchronization circuit having extreme noise suppression capability without thereby limiting the tuning range.

Other objects and many of the attendant advantages of this invention will become readily appreciated as the same becomes better understood by reference to the following detailed description when considered in connection with the accompanying drawings wherein.

Figure 1:
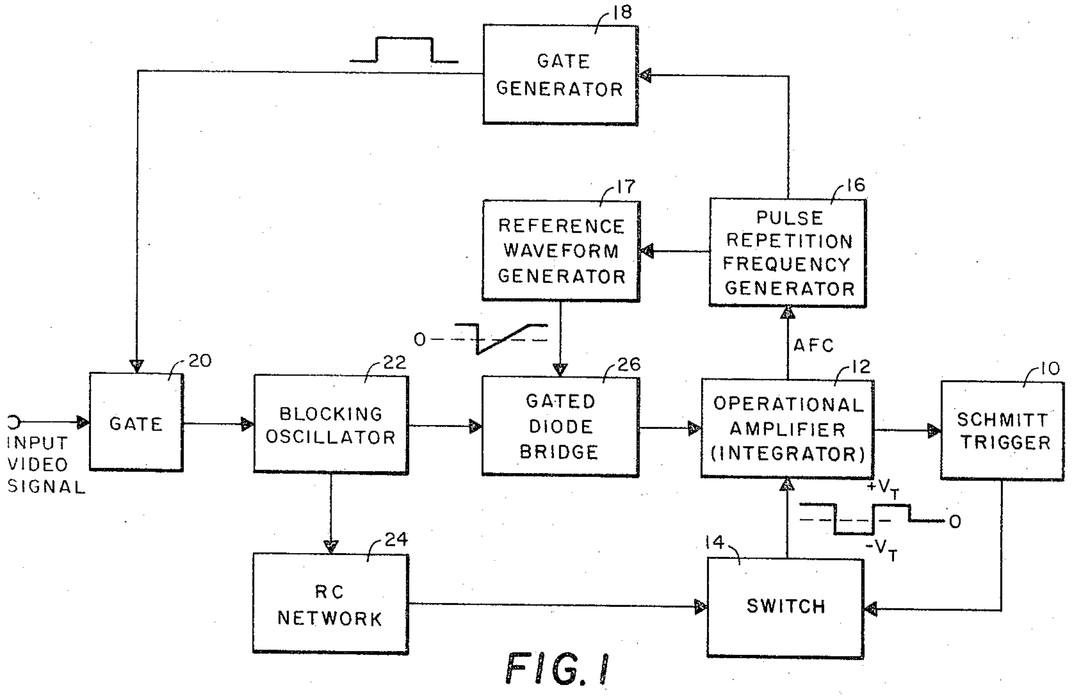
FIG. 1 is a block diagram of an embodiment of the invention.

In tuning a PRF generator to the PRF of a video signal using the circuit shown in FIG. 1, a triangular sweep voltage is generated by connecting the output of a Schmitt trigger 10 to the input of an integrator (operational amplifier) 12 via a switch circuit 14. The output voltage of the Schmitt trigger 10 is so adjusted that it is either $+V_T$ or $-V_T$, depending on the state of the circuit. When no video signal is applied to the circuit input switch 14 is closed and the output of the Schmitt trigger 10 is integrated by the operational amplifier 12. When the output of the operational amplifier reaches a certain level, the Schmitt trigger is triggered and switches to the other state, i.e., the polarity of its output voltage changes and causes the output voltage of the operational amplifier to go in the other direction. After it reaches another preset level, the Schmitt trigger switches back to its former state and the cycle is repeated.

Figure 2:
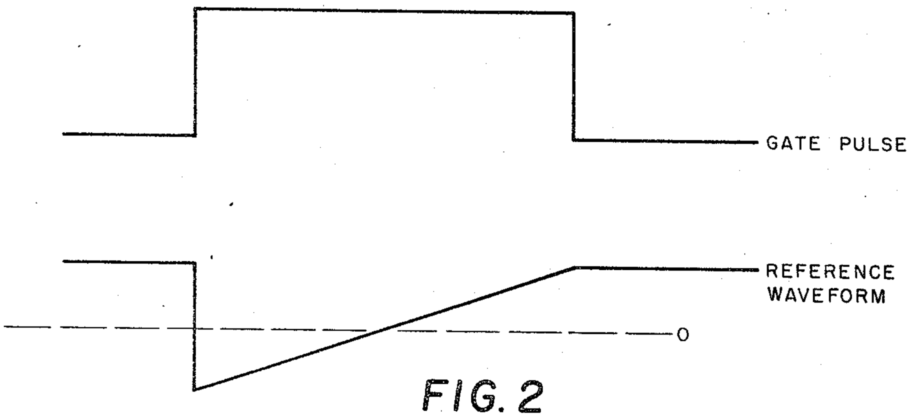
FIG. 2 shows a gate pulse and a reference waveform derived from the output of the PRF generator.

As another output, the AFC, of the operational amplifier 12 is connected to the voltage controlled PRF generator 16, for instance as the bias voltage of a stable or an astable multivibrator, the frequency of generator 16 changes according to the AFC output of the operational amplifier 12, thereby sweeping over a certain frequency range. A gate pulse and a reference waveform as shown in FIG. 2 are derived from the output of the PRF generator 16. The output from PRF generator 16 is fed to a reference waveform generator 17 and also to a gate generator 18 which in turn provides gating pulses to gate 20. If an input video signal is applied to gate 20, it can trigger the blocking oscillator 22 only if it coincides with the gating pulse. The closer the frequencies of the input video signal and the PRF generator 16 are to each other, the more successive pulses will pass this gate 20 and trigger the blocking oscillator 22. The output of the blocking oscillator 22 is integrated by an RC-network 24 and fed to the switch circuit 14. If the frequencies are almost equal, enough pulses are generated by blocking oscillator 22 to increase the output of the RC-network that far, so that switching circuit 14 becomes activated and disconnects the Schmitt trigger output from the input of operational amplifier 12. This terminates the coarse tuning action. The final tuning and the synchronization of the two frequencies are accomplished by a conventional phase lock loop. The reference waveform output from generator 17 is sampled by the pulses of blocking oscillator 22 in a gated diode bridge 26 and the thus obtained error voltage is fed to the operational amplifier 12. The AFC voltage changes now according to the error voltage and corrects the frequency of PRF generator 16 until the two signals are in phase (error voltage zero). If the input video signal is interrupted, switch circuit 14 connects the Schmitt trigger 10 with the operational amplifier 12 again and the circuit is ready to repeat the tuning process.

Both the tuning and synchronizing of the PRF generator is automatic and is accomplished by electronic means. This circuit combines a search-and-synchronization circuit into one integrated system. Since a narrow gate can be used in the present circuit, the system has an extreme noise suppression capability without thereby limiting the tuning range.

Obviously many modifications and variations of the present invention are possible in the light of the above teachings. It is therefore to be understood that within the scope of the appended claims the invention may be practiced otherwise than as specifically described.

What is claimed is:

1. A system for automatically tuning and synchronizing a pulse repetition frequency generator to the pulse repetition frequency of a video signal, comprising:

(a) a Schmitt trigger circuit whose output voltage polarity is reversible, (b) an operational amplifier-integrator means having an AFC output and an output for switching said Schmitt trigger from one polarity to the other.

(c) a switching circuit means, (d) the output of said Schmitt trigger being connected to the input of said operational amplifier-integrator means via said switching circuit means; said switching circuit means being normally closed when no video signal is applied to the system at which time the output of said Schmitt trigger is integrated by said operational amplifier-integrator means, and the output of said operational amplifier-integrator means when reaching certain level causing said Schmitt trigger to reverse polarity which in turn causes the output of said operational amplifier-integrator means to reverse until another predetermined level is reached and the Schmitt trigger switches back and the cycle repeated, (e) an input gate means, (f) a pulse repetition frequency generator, (g) the AFC output of said operational amplifier-integrator means being fed to said pulse repetition frequency generator whose frequency changes according to said AFC output fed thereto thereby sweeping over a desired frequency range, (h) means for providing a gate pulse to said input gate means derived from the output of said pulse repetition frequency generator, and means for providing a reference waveform derived from the output of said pulse repetition frequency generator, (i) a blocking oscillator fed by the output from said input gate means, (j) an RC-network which integrates the output of said blocking oscillator and whose output in turn is fed to said switching circuit means, (k) an input video signal applied to said input gate means being permitted to pass and trigger said blocking oscillator only when the video signal coincides with said gating pulse derived from said pulse repetition frequency generator, and when the frequencies of the video signal and gating pulse are nearly equal sufficient pulses being generated by said blocking oscillator to increase the output of said RC-network to activate the switching circuit means and disconnect said Schmitt trigger output from the input to said operational amplifier-integrator means thus terminating the coarse tuning action, (l) a gated diode bridge to which said reference waveform is fed and sampled by pulses from said blocking oscillator which are also fed thereto, the output from said gated diode bridge being an error voltage which is fed to said operational amplifier-integrator means for changing the AFC voltage therefrom and to correct the frequency of said pulse repetition frequency generator until the error voltage is zero which occurs when the input video signal and the pulse repetition frequency generator signal are in phase, and said switching means again connecting said Schmitt trigger with said operational amplifier-integrator means automatically when the input video signal is interrupted for repeating of the tuning process.

2. A system for automatically tuning and synchronizing a pulse repetition frequency generator to the pulse repetition frequency of a video signal, comprising:

(a) a trigger circuit whose output voltage polarity is reversible, (b) an integrator means having an AFC output and an integrated output, (c) a switching circuit means which is normally closed when no signal is applied to the system, (d) the output of said trigger circuit being connected to the input of said integrator means via said switching circuit means; said integrator means causing said trigger circuit to reverse polarity and in turn causes said integrator means to reverse repeating the cycle, (e) an input gate means, (f) a pulse repetition frequency generator, (g) the AFC output of said integrator means being fed to said pulse repetition frequency generator, (h) gating pulses for operating said input gate and a reference waveform being derived from outputs of said pulse repetition frequency generator, said gate pulse, (i) a blocking oscillator fed by the output from said input gate means, (j) an RC-network for integrating the output of said blocking oscillator and whose output in turn is fed to said switching circuit means, (k) an input video signal triggering said blocking oscillator when coinciding with said gating pulse and when their frequencies are nearly equal said blocking oscillator causing said RC-network to activate the switching circuit means and disconnect said trigger circuit output thus terminating the coarse tuning action, (l) a gated bridge network to which said reference waveform is fed and sampled by pulses from said blocking oscillator, an error voltage output from said bridge network being fed to said integrator means for changing the AFC voltage to correct the frequency of said pulse repetition frequency generator until the error voltage is zero, and said switching means again connecting trigger circuit with said integrator means when the input video signal is interrupted.

No references cited.

ROY LAKE, *Primary Examiner.*

J. KOMINSKI, *Assistant Examiner.*